(12) United States Patent
Newland

(10) Patent No.: US 7,913,053 B1
(45) Date of Patent: Mar. 22, 2011

(54) SYSTEM AND METHOD FOR ARCHIVAL OF MESSAGES IN SIZE-LIMITED CONTAINERS AND SEPARATE ARCHIVAL OF ATTACHMENTS IN CONTENT ADDRESSABLE STORAGE

(75) Inventor: Richard Newland, Reading (GB)

(73) Assignee: Symantec Operating Corporation, Moutain View, CA (US)

( * ) Notice: Subject to any disclaimer, the term of this patent is extended or adjusted under 35 U.S.C. 154(b) by 417 days.

(21) Appl. No.: 11/058,614

(22) Filed: Feb. 15, 2005

(51) Int. Cl.
 *G06F 13/00* (2006.01)
(52) U.S. Cl. ......... 711/172; 711/108; 711/170; 173/165
(58) Field of Classification Search .............. 711/161, 711/108, 172, 170; 709/204, 206, 217; 713/165; 714/20
See application file for complete search history.

(56) References Cited

U.S. PATENT DOCUMENTS

| | | | | |
|---|---|---|---|---|
| 5,903,627 | A * | 5/1999 | Shaffer et al. | 379/67.1 |
| 6,807,632 | B1 * | 10/2004 | Carpentier et al. | 713/165 |
| 6,839,741 | B1 | 1/2005 | Tsai | |
| 6,981,177 | B2 | 12/2005 | Beattie | |
| 7,003,551 | B2 | 2/2006 | Malik | |
| 7,058,682 | B2 * | 6/2006 | McGee et al. | 709/204 |
| 7,080,099 | B2 | 7/2006 | Tada | |
| 7,117,247 | B2 | 10/2006 | Hyakutake | |
| 7,155,481 | B2 | 12/2006 | Prahlad | |
| 7,165,082 | B1 * | 1/2007 | DeVos | 707/203 |
| 7,251,680 | B2 * | 7/2007 | DeVos | 709/206 |
| 7,310,654 | B2 | 12/2007 | McNeil | |
| 2002/0120678 | A1 | 8/2002 | Jones | |
| 2002/0122543 | A1 | 9/2002 | Rowen | |
| 2002/0198944 | A1 | 12/2002 | Moss | |
| 2003/0135524 | A1 | 7/2003 | Cane | |
| 2004/0034688 | A1 | 2/2004 | Dunn | |
| 2004/0133645 | A1 | 7/2004 | Massanelli | |
| 2005/0015721 | A1 | 1/2005 | Tsai | |
| 2005/0050146 | A1 | 3/2005 | Jani | |
| 2005/0060375 | A1 | 3/2005 | Ernest | |
| 2005/0080823 | A1 * | 4/2005 | Collins | 707/200 |
| 2005/0114450 | A1 * | 5/2005 | DeVos | 709/206 |
| 2006/0107018 | A1 * | 5/2006 | Lyle et al. | 711/172 |
| 2006/0143282 | A1 * | 6/2006 | Brown et al. | 709/217 |

FOREIGN PATENT DOCUMENTS

| | | |
|---|---|---|
| WO | 01/06366 | 1/2001 |
| WO | 02/058347 | 7/2002 |
| WO | 02/065316 | 8/2002 |

OTHER PUBLICATIONS

Fugatt: "Backing Up Exchange 2000 Using Windows 2000 Backup", Pentech Office Solutions, Inc.; Jan. 20, 2003.
"Backup Exec for Windows NT and Windows 2000;" Veritas Software Corp., Oct. 2001.

(Continued)

*Primary Examiner* — Yong Choe
(74) *Attorney, Agent, or Firm* — Meyertons, Hood, Kivlin, Kowert & Goetzel, P.C.

(57) ABSTRACT

A method for archival of messages in content addressable storage can be provided. The method can comprise identifying a plurality of messages for archival. The identified messages can be subjected to extraction of attachments therefrom. The messages, minus any removed attachments, can then be concatenated into a container file. Finally, the container file and the extracted attachments are stored in a content addressable storage system.

20 Claims, 9 Drawing Sheets

OTHER PUBLICATIONS

ECMS, CDO Property Tags Constants Declarations Page, May 2, 2001; http://web.archive.org/web/20010502084858/http://www.outlookexchange.com/articles/home/cdopropertytagconstants.asp.

SunOS man pages for "In" http://docsun.cites.uiuc.edu/sun_docs/C/solaris_9/SUNWaman/hman1/In.1.html, 2 pages, 1999.

Bolosky: "Single Instance Storage in Windows 2000;" 4th USENIX Windows Systems Symposium Paper, 2000, 12 pages.

"NetBackup Storage Migrator for Windows v4.0," "Optimizing Storage in Microsoft 2000 & Exchange Server Environments;" Veritas Datasheet, version 2, 2002, 2 pages.

"NetBackup Storage Migrator for Windows v4.1," "Automated Data Management for Windows Environments;" Veritas Datasheet, version 2, 2003, 2 pages.

\* cited by examiner

SYSTEM AND METHOD FOR ARCHIVAL OF MESSAGES IN SIZE-LIMITED CONTAINERS AND SEPARATE ARCHIVAL OF ATTACHMENTS IN CONTENT ADDRESSABLE STORAGE

Portions of this patent application contain materials that are subject to copyright protection. The copyright owner has no objection to the facsimile reproduction by anyone of the patent document or the patent disclosure, as it appears in the Patent and Trademark Office file or records, but otherwise reserves all copyright rights whatsoever.

CROSS REFERENCES TO RELATED APPLICATIONS

The present application is related to the following applications, all of which are filed on the same day and assigned to the same assignee as the present application:

"VERSION MANAGEMENT" (Ser. No. 11/058,587), Inventor: Matthew Spindler.

"UNIVERSAL PLACEHOLDERS" (Ser. No. 11/058,603), Inventor: Derek Allan.

The above-identified applications are all hereby incorporated by reference into the present application.

FIELD

The present invention relates to optimized storage, and in particular but not exclusively to optimizing the efficiency of use of content addressable storage for message archival.

INTRODUCTION

In many commercial fields, there is a need to retain correspondence and data for later access. This may be for internal reasons such as ensuring accountability of a company and traceability of contracts etc. It may also be for external reasons such as regulatory requirements. In some areas of business, such as legal and financial services, very strict regulations regarding keeping of all correspondence may apply. Whilst this is relatively straightforward to achieve with paper files, managing electronic files, and emails in particular, can be much more difficult. An average email user may simply delete an email once he or she has read the content and/or carried out an action specified in the email. Whilst the user has no further use for that email, the company may be required to keep it much longer. Also, individual users may keep emails for a great length of time, causing congestion in mail servers and large mailbox files which may be increasingly liable to corruption or failure as size increases.

One example of a regulatory requirement for keeping of correspondence is that of the financial services industry in the USA, where correspondence is required to be kept for three or six years. The regulations also require that electronic correspondence is stored within 24 hours of receipt on non-modifiable forms of storage such as optical devices or magnetic disks having WORM (write once read many) characteristics.

SUMMARY OF THE INVENTION

The present invention has been made, at least in part, in consideration of problems and drawbacks of conventional systems.

Viewed from a first aspect, the present invention provides a method for archival of messages in content addressable storage. The method can comprise identifying a plurality of messages for archival. The identified messages can be subjected to extraction of attachments therefrom. The messages, minus any removed attachments, can then be concatenated into a container file. Finally, the container file and the extracted attachments are stored in a content addressable storage system. This arrangement allows archived messages to be placed into content addressable storage whilst optimizing the storage space available in the content addressable storage.

According to one embodiment, only attachments greater in size than a predetermined threshold value are extracted. This arrangement provides for further optimizations in the use of the content addressable storage by only extracting attachments which are large enough to be stored separately in a manner efficient for the content addressable storage.

According to another embodiment, a check can be performed to determine whether an extracted attachment has already been stored to the content addressable storage system. If so, the extracted attachment is not stored a further time to the content addressable storage system. This arrangement provides further optimizations in the use of the content addressable storage by preventing duplicates from being stored.

Viewed from a second aspect, the present invention provides a system for migration of stored data to content addressable storage. The system can comprise a candidate identifier operable to identify messages for archival; and a message analyzer operable to extract attachments from the messages. The system can also comprise a collator operable to concatenate the messages into a container file; and a storage manager operable to store the container file in a content addressable storage system and to store said extracted attachments in said content addressable storage system. This arrangement allows archived messages to be placed into content addressable storage whilst optimizing the storage space available in the content addressable storage.

Viewed from a further aspect, the present invention provides a message archival system. The system can comprise a storage database in which archived messages can be stored. The storage database can include a content addressable storage portion for storage of messages. Messages which it is desired to store in content addressable storage can be collected into a conglomeration file for storage into the content addressable storage portion of the storage database.

The arrangements of these various methods and systems are equally applicable to WORM (write once read many) implementations of content addressable storage because the conglomeration is done separately in re-writable storage. However, as noted above it can be applied both to WORM and non-WORM versions of content addressable storage.

In many cases, the majority of the storage volume used by a given message store is occupied by large attachments to messages. This can be up to 80-90% of the storage volume. Many messages are identical due to having copies for sender and (possibly multiple) recipient(s). Further, many attachments are repeated in different messages. Therefore, significant storage optimization can be achieved by only storing one copy of each attachment regardless of the number of messages to which it belongs. Where a content addressable store is used for message storage, further optimization can be achieved by reducing the number of files stored in the content addressable store. This can be achieved by concatenating large numbers of messages into single container files while at the same time achieving the above mentioned sharing of identical attachments by extracting them from the containers and storing them separately.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which.

Figure 1:
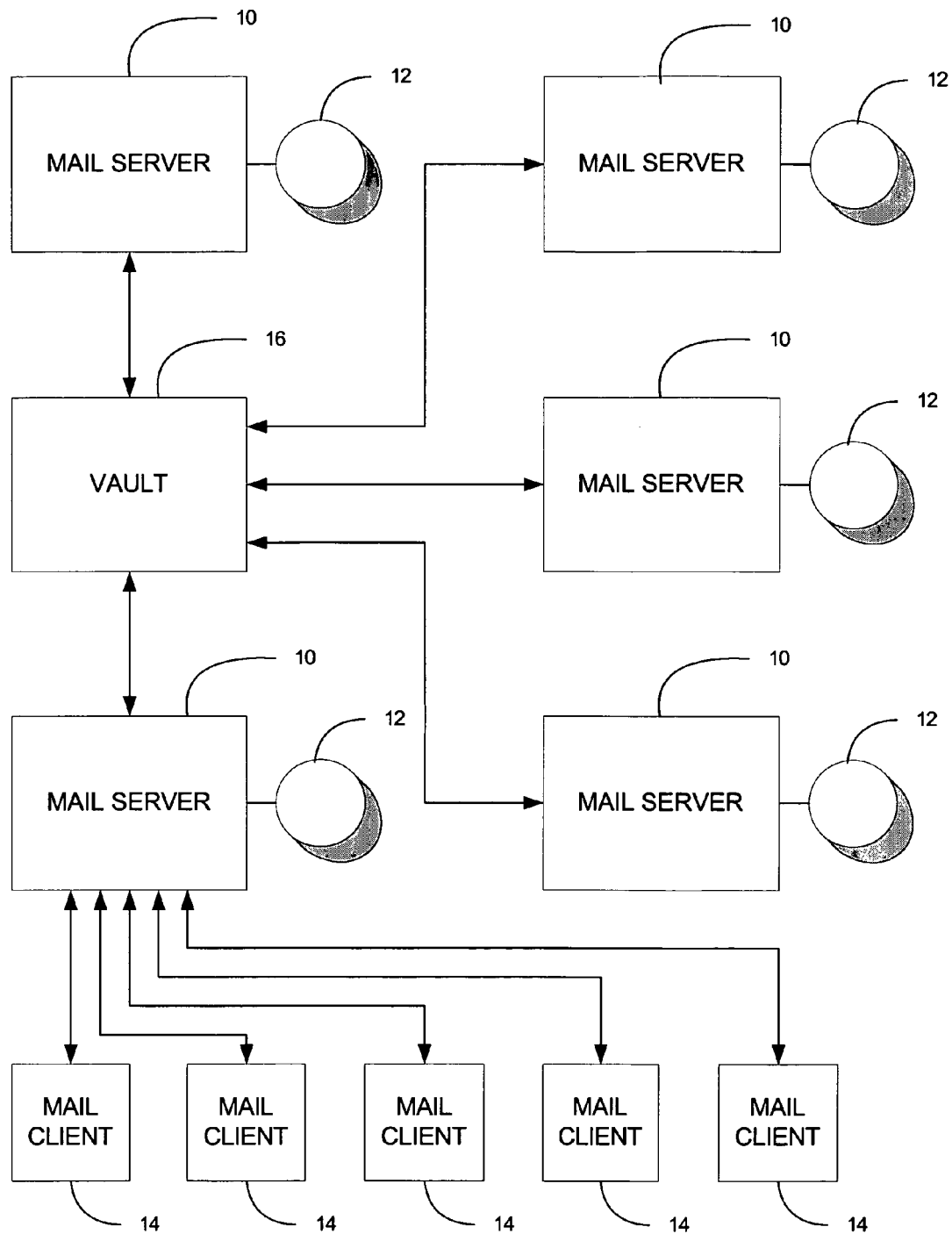
FIG. 1 shows a schematic overview of an example of a computer network where messages from a plurality of email servers can be archived to a vault system.

While the invention is susceptible to various modifications and alternative forms, specific embodiments' are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

Vault Overview

Electronic archiving of electronic files, particularly email messages, can be achieved using a vault system of the type depicted in FIG. 1.

In the system shown in FIG. 1, a plurality of mail servers 10 each have a local mail store 12. In the present example, the mail servers 10 can be conventional server computers utilizing Intel™ Xeon™ or AMD™ Opteron™ server microprocessors and running Microsoft™ Windows™ Server operating system software and running Microsoft™ Exchange™ email server software. The local mail store 12 can be a hard disk drive or hard disk drive array such as a RAID (Redundant Array of Inexpensive Disks) storing the email messages in a Microsoft™ Exchange™ mailbox format. In other examples, server computers using different hardware such as Alpha™, x86 or Sparc™ processors could be used. Also, alternative operating system software such as UNIX™, Linux™, OS/2™ or Solaris™ could be used and alternative email server software such as Lotus™ Notes™ and Domino™ email server software.

Each mail server 10 is a stand alone and independently operable email server and provides email services to a plurality of email clients 14. In the present example, each email client 14 is an instance of Microsoft™ Outlook™ or Microsoft™ Outlook Express™ operable to connect to the mail server 10 for mailbox access, or an instance of an html browser such as Microsoft™ Internet Explorer™ or Mozilla™ Firefox™ connected via the Microsoft™ Outlook™ Web Access interface for mailbox access. The mail client 14 may be run on a dedicated computer or may be one of a plurality of software applications available for use on a multi-purpose computer. An example of such a multi-purpose computer is a computer based on the PC-compatible format developed by IBM Corporation and using hardware such as an x86 compatible microprocessor and an operating system such as a version of Microsoft™ Windows™ or Linux™.

In the present example, each of the mail servers 10 is operable to provide email services to each of a plurality of mail clients 14, all within the same commercial entity. For compliance with internal business requirements and/or external regulatory requirements, the commercial entity has to keep all email correspondence for a predetermined length of time. In the present example, this includes a period of four years in immediately accessible storage and a further six years in non-immediately accessible, or offline, storage.

To manage storage and retrieval of such email storage, a vault system 16 is deployed, operable to store messages which it is no longer convenient or desirable to store at the local mail stores 12 at the mail servers 10. A decisions as to when it is inconvenient or undesirable to store messages at the local mail a stores 12 can be made in one of a number of ways. These can include a rules-based decision process causing all messages to be archived to vault 16 once they reach a certain age and a decision on a per message basis by an individual mailbox user.

The vault 16 can have a variety of storage resources for storing messages archived thereto. These can include online storage such as one or more hard disk drive RAID arrays or a content addressable storage array, and off-line storage media such as tape drives and MO (magneto-optical) disk arrays or jukeboxes. The vault 16 can include one or more server computers configured to manage the archival, storage and retrieval of data stored therein. The server computer(s) can be conventional server computers utilizing Intel™ Xeon™ or AMD™ Opteron™ server microprocessors and running Microsoft™ Windows™ Server operating system software and running dedicated vault management software. In other examples, server computers using different hardware such as Alpha™, x86 or Sparc™ processors could be used. Also, alternative operating system software such as UNIX™, Linux™, OS/2™, Solaris™ or a dedicated operating system incorporating vault management software could be used.

In operation, a message stored in the local mail store 12 of one of the mail servers 10 can be archived to the vault 16 upon command. The message is removed from the local mail store and placed into the vault 16. To achieve this, in the present example the message is extracted from the Exchange™ store using a standard API (application program interface) supplied by Microsoft™ for this purpose. The message is then analyzed to extract information describing the message, such as title, sender, recipient, as well as the textual content of the main message header and the names of any attachments etc. Any attachments to the message are converted to text for indexing purposes. For files which it is not possible to convert to meaningful text content, for example image files, only the filename and size plus any metadata (e.g. title, author, etc) included with the image are used for indexing purposes. A suitable software tool for performing this data conversion is produced by Stellent, Inc of Eden Prairie, Minn., USA. This information is then used to build an index entry for the message to be included in an index database for archived items. Using the index database, a search engine can be provided to a user to search for archived items. The message itself is placed into storage in the vault 16 at a storage location identified in the index entry.

In the Exchange™ store, the message is replaced by a stub or placeholder which can include standard properties such as sender, recipient, title and date, and can also include some or all of the message header text to enable identification of the message. In one example, the first 100 characters of the message are retained in the placeholder. In the present example, the placeholder also includes a hypertext link to the archived message, such that a user selecting the hypertext link can have the archived message displayed and made available for forwarding, replying to, printing or other conventional email handling action. This will be described in more detail below.

Thus there has now been described an overview of an email archival system for long-term storage of email messages sent and received by an email client user.

Data Sources and Retrieval

Figure 2:
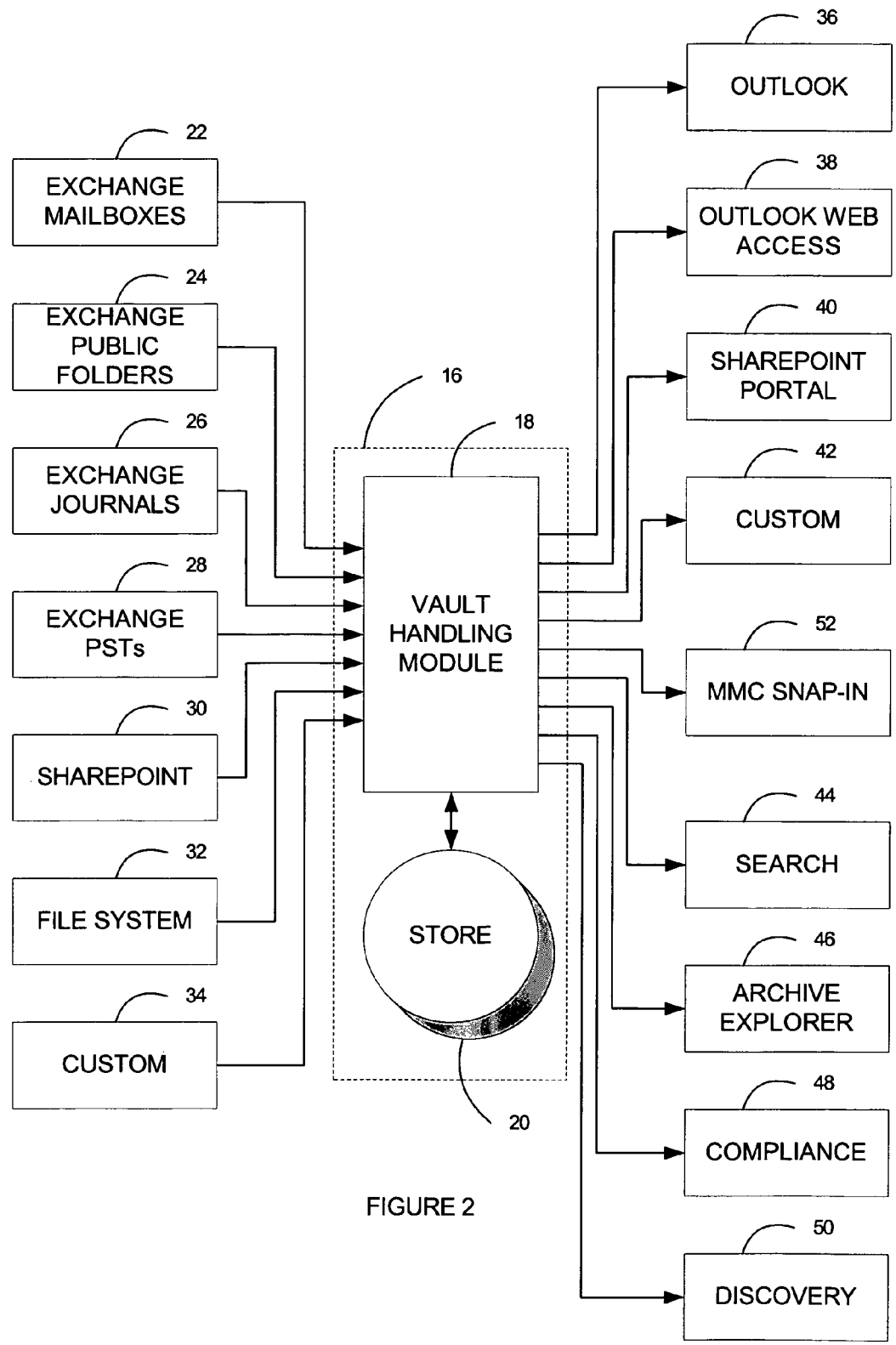
FIG. 2 shows a schematic representation of input and output types to and from the vault system of FIG. 1.

FIG. 2 shows an example of data sources which can provide data for storage in the vault and access methods for retrieving and accessing that data.

As shown in FIG. 2, the vault 16 can be logically considered to include a vault handling module 18 and a store 20. The vault handling module can be a number of software modules running on one or more server computers and the store can be a number of physical storage devices used under management of the vault handling module to store data entrusted to the vault. The vault handling module 18 can perform the index generation, placeholder generation, message storage and message retrieval functions, whilst the store 20 holds the messages. The store 20 can be a combination of physical storage resources, such as one or more RAID arrays and can also include one or more off-line storage media such as tape drives.

The vault of the present example can receive input in the form of data for archival from a number of sources. Examples of such sources are shown in FIG. 2 and are as follows. Exchange™ mailboxes 22 such as those previously discussed with respect to FIG. 1 above can supply messages for storage in the vault 16. Also, Exchange™ public folders 24 can be a source of data for storage in the vault 16. As Exchange™ public folders can be considered to be shareable folders within Exchange™, supply of messages for archival from these folders can be handled as with archival from Exchange™ mailboxes. Also, Exchange™ journals 26 can supply messages for storage in the vault 16. An Exchange™ journal is a special mailbox which captures a copy of every email sent or received at a given email server or at a given message store. A journal archive service can be configured to pick up all messages appearing in an Exchange™ journal and can be configured to archive all emails in the journal, alternatively, rules based on groups of user mailboxes and/or categories and/or properties of message can be used to control the messages stored in the journal archive. Archival of a journal mailbox provides a solution to the problem of individual users deleting emails from their individual mailboxes prior to those items being archived to the vault. In this way, all messages received or sent by a user can be archived irrespective of whether that user intends for them to be kept from a personal point of view.

Other sources of messages for storage in the present example include Exchange™ .pst files 28. The .pst file is an alternative to the Exchange™ store for storing emails and is typically the store type used for stand-alone instances of Outlook™ and where the pop3 mailbox protocol is used for delivery of emails for an Outlook™ client. Also, SharePoint™ data sources 30 can be archived to the vault. SharePoint™ provides a centralized arrangement for sharing of documents and information between different users and, in the present example, materials available via a SharePoint™ system can be archived to the vault 16.

Another source of items for storage in the vault 16 is the general file system 32. In the present example, a user can identify any document in his file system and instruct that it be archived to the vault 16. Finally, custom data sources 34 can be specified for archival to the vault 16. Examples of such custom data sources include non-Microsoft email sources, such as Lotus Notes/Domino and instant messaging content from instant messaging clients such as MSN Messenger, Windows Messenger and AOL Instant Messenger. Instant messaging can be a particular difficulty for regulatory recordal as the nature of the transactions is such that no message storage takes place, each message is simply delivered straight away to its recipient, which recipient can then read and reply to the message. By providing a custom data input channel to the vault from an instant messaging system, the messages can be recorded by means of archival in the vault 16.

Each item archived to the vault can have a named retention policy applied thereto. The retention policy may be a policy designed to meet a regulatory requirement for document storage, indicating that a given data object be kept for a period of, for example, six years and then deleted once that age is exceeded. A retention policy may specify a shorted lifespan if the archived data object is one which is not affected by a regulatory retention requirement. A retention policy may specify a longer lifespan than that required by any relevant regulatory requirement if an archiving user believes that a longer lifespan is necessary. Examples of such documents, could include documents which relate to an item of business which is expected to continue for many years. Examples of such data objects may include documents relating to intellectual property rights, which in the case of patents typically have a lifespan of up to 20 years, in the case of trademarks typically have no fixed lifespan and can be maintained indefinitely. Other examples could include employee records where the records need to be maintained during the entire employment period of an employee.

Thus a large range of data import possibilities exist for archival to the vault 16. As will be appreciated from the above description, the vault 16 of the present example is able to store conventional data files as well as email messages extracted from some form of message store. Different import and document handling options can be applied to different data sources, as will be described now with reference to FIGS. 3 and 4.

Figure 3:
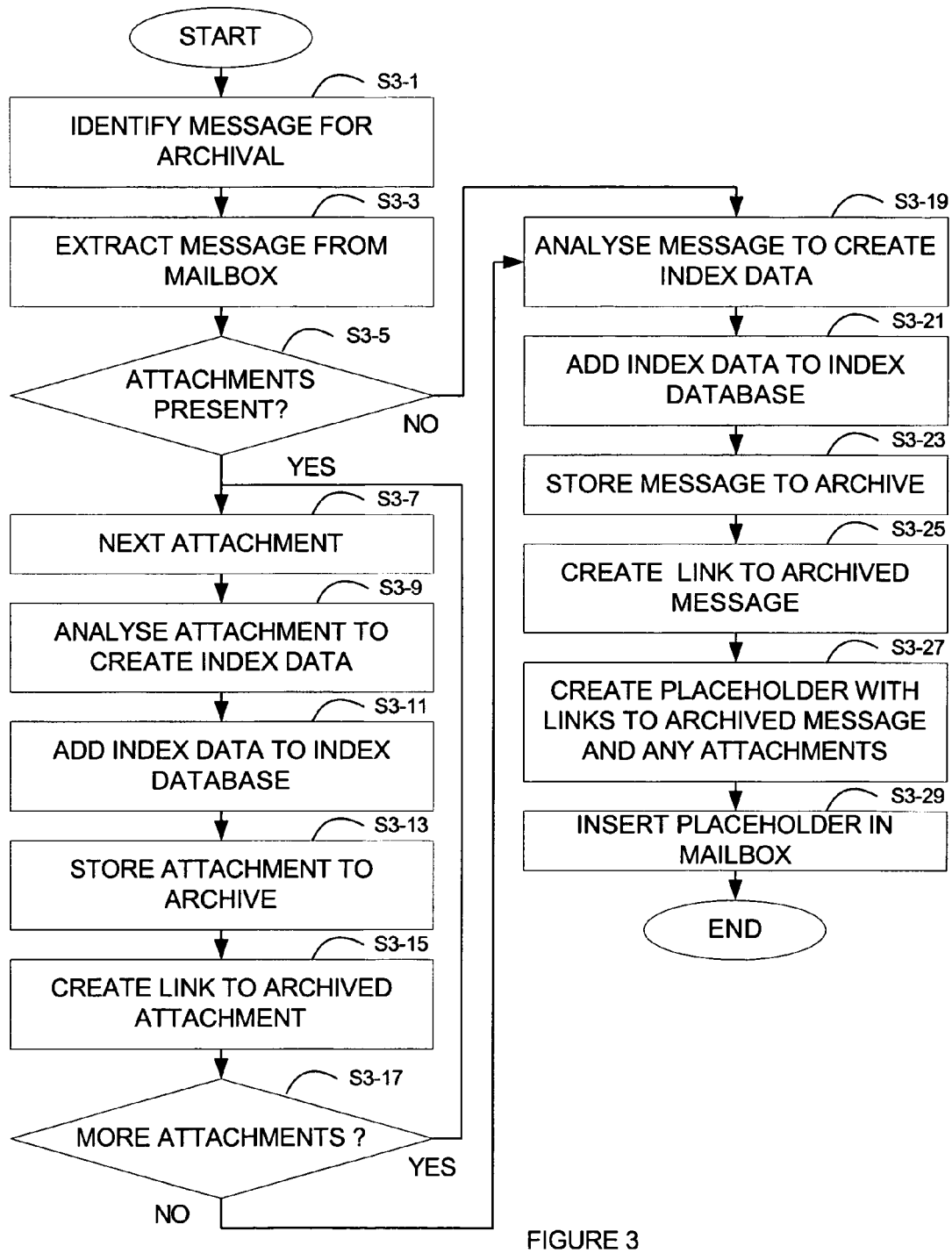
FIG. 3 shows a flow diagram of steps carried out during a message archival process.

FIG. 3 shows an example of processing steps carried out during the archival of an email message from a mailbox store such as an Exchange mailbox 22, an Exchange public folder 24, an Exchange journal 26, an Exchange .pst 28 or a custom data source 34 such as a non-Microsoft mailbox such as Lotus Notes/Domino. In this example, the messages are subjected to attachment separation for single instance control upon storage to the vault. In other examples, attachments may be left attached to the message within the vault.

First, a message is identified for archival at step S3-1. This message is then extracted from the mailbox at step S3-3 using, for example, an API provided by the mailbox software vendor for the purpose.

The extracted message is then analyzed at step S3-5 to determine whether the message has any attachments. If attachments are present, then at step S3-7 a next attachment is selected for analysis at step S3-9. This analysis results in index data describing the document for search and retrieval purposes. The index data is then added to an index database at step S3-11. The index database returns a storage location identifier and the attachment is stored to the database at the location specified by the storage location identifier at step S3-13. Using the storage location identifier, data describing the location of the archived attachment is created at step S3-15. Once this attachment has been dealt with, a check is performed at step S3-17 to determine whether more attachments were present. If so, processing returns to step S3-7 where a next attachment is selected.

On the other hand, if there are no more attachments following step S3-17, or if it is determined at step S3-5 that the message had no attachments, then processing continues at step S3-19 where the message itself is analyzed to determine index data describing the message. Once this index data describing the message and its properties is created, the index data is then added to the index database at step S3-21. The database returns a storage location identifier for the message. A copy of the message is then stored into the archive at the storage location identifier returned by the index database at step S3-23. Then, at step S3-25, using the storage location identifier, data describing the location of the archived attachment is created. Using the storage location identifier for the message and the storage location identifiers for any attachments that the message may have had, a placeholder message is created including links to the stored message and any attachments in the archive at step S3-27. The placeholder is inserted into the mailbox at step S3-29 at the location in the mailbox from where the message was extracted.

Thus there has now been described a method for archiving an email message with or without attachments to a vault, leaving a placeholder message in the mailbox. The placeholder message allows a user to see certain properties of the message, such as sender details, recipient details, date and message title/subject. An extract from the text of the message can also be left within the placeholder message, which can include the first few characters of the message or the whole message. The user can also use the direct link to the archived message and attachments to retrieve the archived message and/or attachments for viewing. Thus the archived message is securely stored away from primary online storage at a mail server, but is easily accessible in a contextually useful manner to a user wishing to read the message.

Archival of non-email items can, as with email archiving, be manual or automated or a mix of both. For example, a user may have an option to archive a file at any time. Additionally, an archival policy based on rules dependent upon the nature and use of a file can be implemented to automate archival to vault storage. Examples of rules which can be used in such circumstances include a "big files" rule where all files over a certain size threshold (e.g. 1 Mb) and age since last access (e.g. 1 month) are automatically archived. Also, a rule can be created for "unpopular" files to be archived, for example any file not accessed within the previous year can be automatically archived. In some examples, a user can set a "do not archive" property for a file such that it is excluded from automatic archival operations regardless of whether it would otherwise be identified as an archival candidate by a rules based policy.

Figure 4:
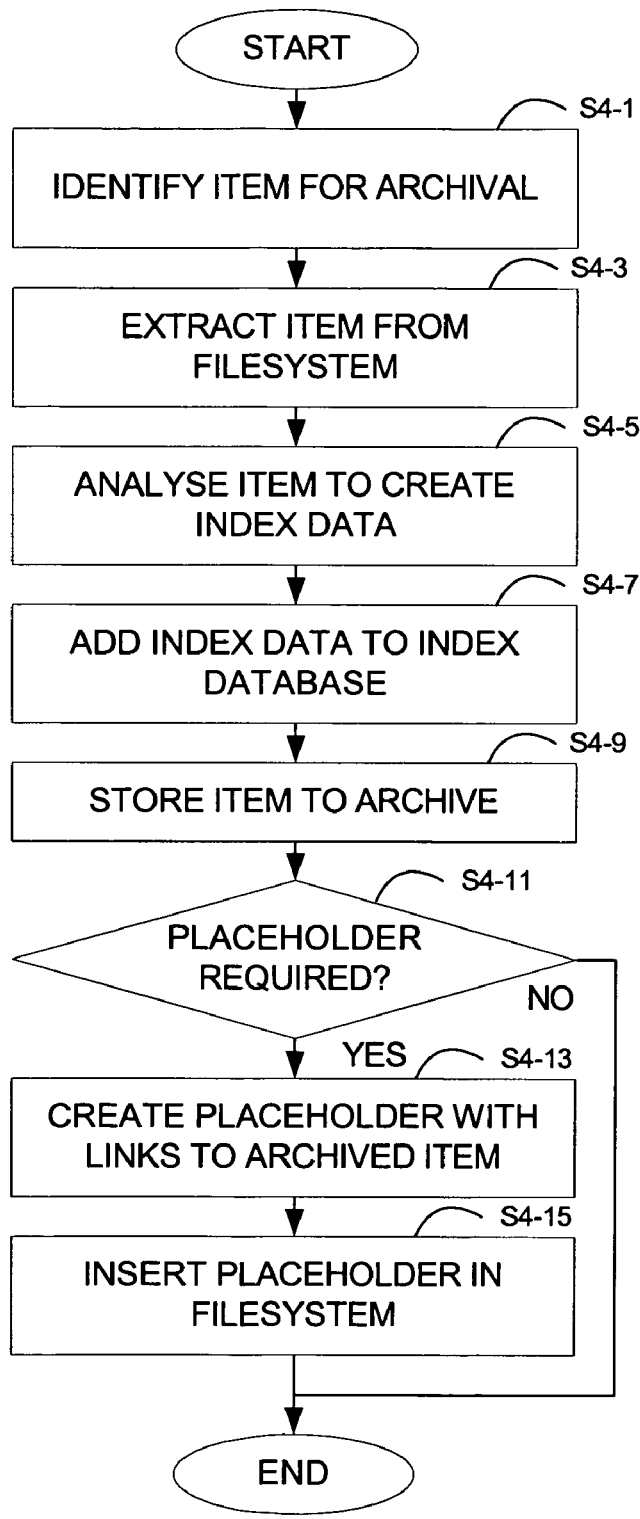
FIG. 4 shows a flow diagram of steps carried out during a data object archival process.

FIG. 4 shows an example of processing steps carried out during the archival of a data item from a source other than an email mailbox, such as a SharePoint system 30 or a file system 32. First, a data item is identified for archival at step S4-1. This item is then extracted from the file system at step S4-3 using, for example, the standard functionality of the file system.

At step S4-5 the item is analyzed to create index data describing the item for search and retrieval purposes. The index data is then added to an index database at step S4-7. The index database returns a storage location identifier and the item is stored to the database at the location specified by the storage location identifier at step S4-9. Next, at step S4-11, a check is performed to determine whether a placeholder for the item is required. If not, the archival process is complete and the method ends. On the other hand, if a placeholder is required, then at step S4-13, a placeholder item is created using the storage location identifier. In the present example, the placeholder format is defined by the standard mechanism for the target store so that its use will be transparent to any user or application interface. For example in a Windows™ file system, a standard Windows File System placeholder is used in conjunction with a purpose built Windows™ filter which is capable of automatically retrieving the item from the vault when the placeholder is accessed. Then, at step S4-15, the placeholder item is inserted into the file system at the place from which the item was removed and the process ends.

Thus there has now been described a method for archiving a data item with the option for leaving a placeholder item at the location from where the data item was archived. The placeholder item allows a user to read certain properties of the item, and in some cases the first few characters of the item, and to use the direct link to the archived data item to retrieve the archived item for viewing. Thus the archived item is securely stored away from primary online storage at a file server, but is easily accessible in a contextually useful manner to a user wishing to access the item.

Referring again to FIG. 2, the items stored in the vault 16 can be accessed in a variety of ways. These include via an Outlook mail client 36, the Outlook web access module 38, a SharePoint™ portal 40 or a custom web interface 42. These interfaces are those which may be considered to be "traditional" email interfaces and therefore may be thought of as having a primary purpose in the present example of accessing archived email messages and attachments. However, these interfaces can also be used to retrieve non-email archived items, for example by making a file system archive available via the client. Additionally, archived items may be retrieved using a search interface 44 or an explorer style interface 46. In some circumstances, such as proving that regulatory requirements have been complied with or for identifying documents for a legal discovery or disclosure process, tailored access modules 48, 50 configured to identify and retrieve all appropriate documents may be used.

In the present example, the primary method for accessing archived items via one of the email interfaces 36, 38, 40, 42 is by means of the email placeholders inserted into the mailbox during the archival process, as discussed with reference to FIG. 3 above. In the present example, the email placeholders are transparent to the application, that is to say the client software through with the placeholders are viewed is able to treat the placeholder as a standard email message and needs no dedicated placeholder handling module or software to be installed. To aid user identification of the placeholders as such from a conventional mailbox view, the placeholder messages may be identified by a graphical user interface (GUI) icon different to the standard GUI icon applied to an email message. This can be achieved by assigning the placeholder message a particular message type identifier, which message type identifier can be associated with a desired GUI icon within the client software.

In the present example, if a user deletes a placeholder message from a mailbox this action only deletes the placeholder message and has no effect on the archived message. Thereby even though the user no longer has a use for the message, it is retained for regulatory compliance and/or internal accountability purposes. In some examples, it may be possible to completely delete messages not required to be kept for regulatory compliance or internal accountability purposes, such that the message is also deleted from the archive. A required deletion behavior can be configured by a system administrator.

For retrieval of non-email archived items in the present example, the primary method for retrieval is also via placeholders using the normal user interface for accessing the items. For example, Windows™ Explorer may be used from a terminal running a Windows™ operating system.

For all archiving sources in the present example, a search interface 44 and archive explorer interface 46 can be provided. The search interface of the present example permits retrieval of archived items, even if the placeholder corresponding to the item has been deleted.

Figure 5:
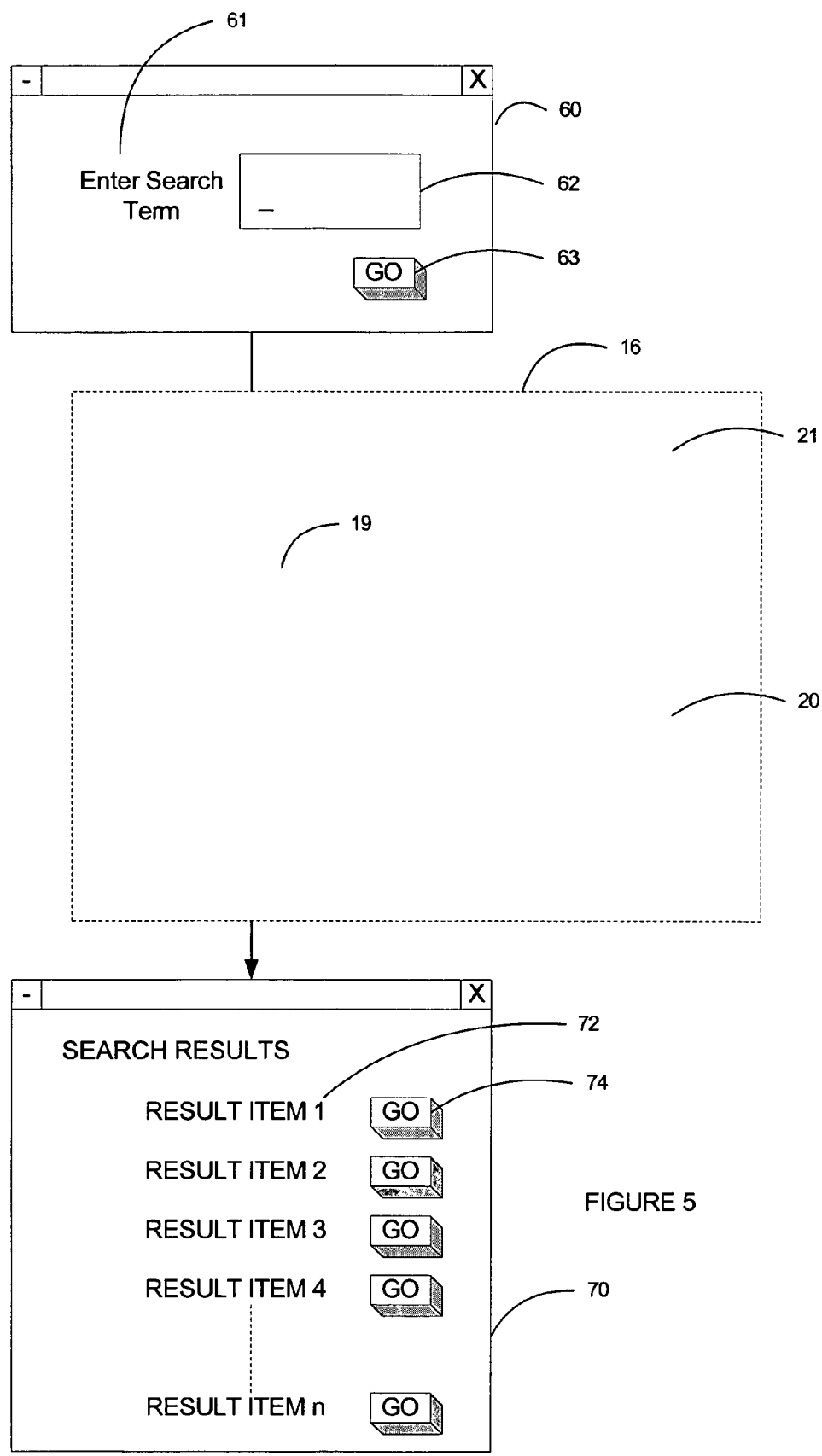
FIG. 5 shows a schematic representation of a search interface.

An example of a search interface 44 for the present example is shown in FIG. 5. As shown in FIG. 5, a user can be presented with a search query window 60 having a prompt 61 for entering a search term into a search term text entry box 62. Once a user has entered a search term into the search term text entry box 62, selecting a "go" button 63 will cause the search term to be submitted to the vault 16.

At the vault 16, the submitted search term is received by a vault query server 19. The vault query server may be a standalone server computer or appliance, or may be a service running on a multi-purpose vault server or appliance. The vault query server may be considered to be a part of the vault handling module 18. In order to handle the submitted search term, the search term may be parsed for handling by the query resolving language of the vault query server 19.

The vault query server 19 then searches the index store 21 for records matching the submitted search term. If any matches are found, the index entries which result in a match are interrogated for details of each matching item. These details are then displayed to a user in search results display box 70. In this box, each matching item is listed with identifying details 72 and an associated selection button 74. The results can be ordered using conventional closeness of match ordering algorithms. If the user selects one of the matches 72 using the associated selection button 74, the vault query server uses the index record for the selected item to retrieve a copy of the item from the store 20 for display to the user (not shown). Such a retrieved copy can be cached within the user's local computer terminal for viewing.

Thus there has now been described a method for retrieval of an archived data item from the store via a search interface 44. Using such a method, stored items can be retrieved by a user, regardless of what the original data type is (email, email attachment, instant message, word processor document, spreadsheet, image etc).

Referring back to FIG. 2, the other retrieval methods identified can be provided to enlarge the range of access options. For the archive explorer interface 46, the contents of the archive can be presented in a hierarchical manner that mirrors the folder hierarchy of the target from which the items were archived. The hierarchical presentation of the archive contents can be navigated and the items retrieved using a web interface regardless of the type of archive.

The compliance and discovery interface modules 48 and 50 can be specifically tailored interface modules designed to aid the retrieval of documents for specific purposes. In the case of the compliance module, supervisor surveillance of a representative sample of documents from a specified range of users can be performed to demonstrate compliance with internal accountability requirements and/or external regulatory requirements. In the case of the discovery module 50, all archived items relating to a specified range of special search terms can be retrieved and then marked or tagged by reviewers. For example, all items relating to a particular business transaction or set of transactions can be retrieved for a legal discovery process.

Thus a wide range of date retrieval methods can be used to access the archived data in the vault. Coupled with the wide range of data sources, a large variety of information can be easily and securely managed though a vault system according to the present example.

Management of the vault system can be achieved via a plug-in module for a conventional management tool such as the Microsoft Management Console (MMC). Such a tool is commonly known as an MMC Snap-in 52. Using such a tool, the behavior of the vault 16 can be controlled by a system administrator to ensure that any specific requirements for the vault system are met. For example, policies to control a time delay between archival of an item and migration of that item to offline storage, user access control or single instance control can be set using the management interface.

User Management

Using management controls available to the Vault 16, an administrator can set policies to govern the behavior of the vault with respect to individual users. Access rights can be mapped from the access rights applied to an archived item, such that a private email can only be viewed by sender and recipient, or a spreadsheet can only be viewed by persons who had access to a folder in which the original document were stored. Such access rights information can be stored as part of the index record for each item, such that when a search term, is submitted as described with reference to FIG. 5 above, the vault query server can automatically add the identity of the user submitting the request to the search query submitted by that user. Accordingly, only items which that user has permission to access would be returned as matches by the vault query server.

Single Instance Control

One way in which the archival system of the present example can be used to maintain a minimal storage configuration for storage is by management of single instance storage. The crux of such a system is that it is desirable to store only a single copy of any given data item, regardless of how many individual users have access to that item. In some circumstances, full single instancing may be impossible, but even in such circumstances, it may be possible to store only e.g. three copies of an item which is accessible to e.g. 150 different users. The system of the present example is implemented as a single instancing system in order to maximize utilization of storage space in the vault.

Taking the example of an email message, after a certain period of time, the various copies of the message in the sender's and recipients' mailboxes will all be archived. If journaling and journal archiving are being performed, then there will already be a copy of the message in the archive. Once each email item has been archived from the journal mailbox, a copy is maintained on the email server (most mail servers also carry out single instancing such that a multi-recipient message is stored once and made accessible to all recipients). That copy is maintained on the email server until all senders or recipients of that message delete or archive "their copy" (although the mail server only maintains a single copy, it appears to each user that they have their own copy in their mailbox). Once all local copies have been archived or deleted, the message is deleted from the email server. When archiving of an already archived email takes place (which is the default state of the system of the present example, as the journal copy is archived very soon after receipt), the archival process outlined with respect to FIG. 3 above is modified. This modified archival process will now be described with reference to FIG. 6.

Figure 6:
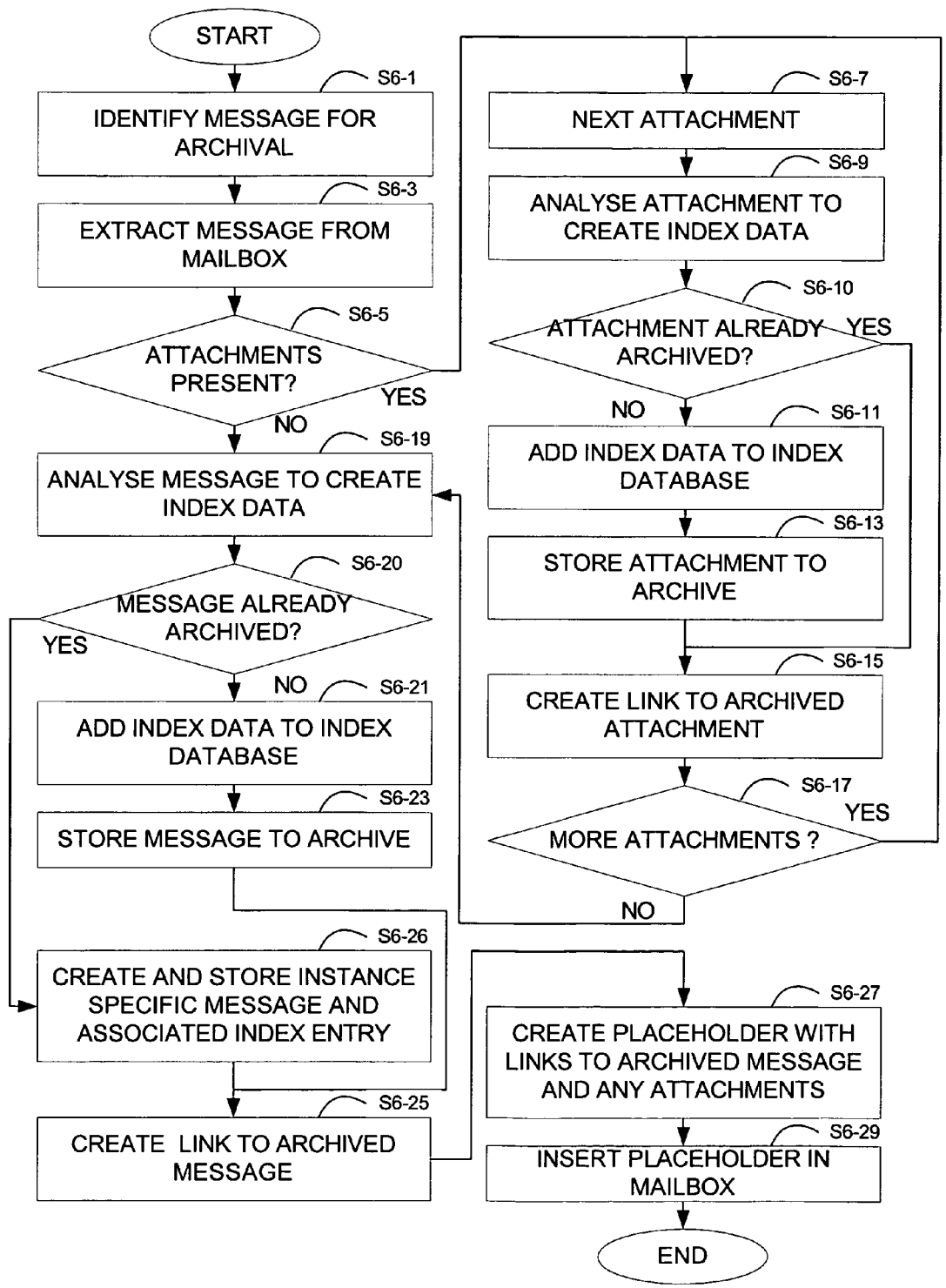
FIG. 6 shows a flow diagram of steps carried out during a single instancing message archival process.

In FIG. 6, steps identical to those carried out in FIG. 3 above are not re-explained fully, rather reference is made to the relevant steps of FIG. 3 for a full explanation.

As shown in FIG. 6, the message is identified for archival, extracted from the mailbox and checked for attachments (steps S6-1, S6-3 and S6-5 corresponding to steps S3-1, S3-3 and S3-5 respectively). If attachments are found, then a next attachment is selected and analyzed to create index data at steps S6-7 and S6-9 (corresponding to steps S3-7 and S3-9 respectively). Then, a check is performed to determine whether the attachment is already present in the archive at step S6-10. If the attachment has already been archived then no new copy is required.

Thus, if no existing copy is present in the archive, then at steps S6-11 and S6-13 (corresponding to steps S3-11 and S3-13), the index data is added to the index database and the attachment is stored to the archive. Then, or if the attachment has already been archived, then a link to the archived attachment is produced at step S6-15 (corresponding to step S3-15). A check for further attachments is performed at step S6-17 (corresponding to step S3-17), which is positive returns to step S6-7 for a next attachment to be selected, and if negative proceeds to step S6-19.

Once all attachments have been processed, or if no attachments were present, at step S6-19 (corresponding to step S3-19) the message is analyzed to create index data. Then, at step S6-20, a check is performed to determine whether an index entry already exists having all fields which describe the archived message identical to the newly created, index data. If not, such that the message has not previously been archived, then an index entry is added to the index database and the message is stored to the archive at steps S6-21 and S6-23 (corresponding to steps S3-21 and S3-23). If the message has previously been archived, an instance specific version of the message is created with an appropriate index entry, and these are added to the store and index database respectively at step S6-26. Following the addition of the message or the instance specific version of the message to the store, a link to the archived message is created at step S6-25 (corresponding to step S3-25) before a placeholder is created and inserted into the mailbox at steps S6-27 and S6-29 (corresponding to steps S3-27 and S3-29).

In the present example, the single instance management of a message can include archiving an instance specific version of the message which includes a pointer to the shared components. The instance specific version can contain per-instance properties of the message, for example, a user's applied title, a user's folder in which the message is stored, and per-user flags indicating whether the message was read, replied to, etc. The shared components can include the message headers (indicating sender, recipients, title, etc), the message text content and any attachments. This instance specific version is transparent to the end user who, upon retrieval of the message, receives the entire message back with the per-instance properties as well as the shared components.

The links embedded in the placeholder messages are conventional hyperlinks which allow any user terminal operable to read hypertext content to access the archived messages. As any terminal operable to use an email client such as Outlook™ or the Outlook™ web access interface in order to access the placeholder message will be so operable, this makes the placeholders universal in the sense that any user terminal which can access the placeholder can also access the archived content. In the present example, the hyperlink leads to a service running within the vault system 16 and may be a part of the vault handling module 18. The hyperlink also includes an argument which identifies the archived content being requested to the service. The service can therefore retrieve the requested content from the vault store 20 and make it available to the requesting user. In some examples, the link can be configured to provide functionality such as message restoration to its original location, deletion from the archive, initiation of the search application, etc as well as causing the message to be displayed. Such additional functionality can be provided by way of additional links embedded within the placeholder message. Access to these links can be by way of user interface buttons which can be selected by a user to perform a desired action.

Thus the archival of a message can take the form of the creation of a new placeholder pointing to an already existent example of the message in the archive if the two messages are identical. If attachments are present, then a similar check for their presence in the archive can be performed for the same reason. In the present example, a separate check is performed for each attachment separate to the message, as it is possible that a user who created the attachment may have archived it before an email to which it was attached is archived, such that the attachment may have been previously archived independently of the message.

Similar checks can be carried out on data items added from sources other than an email mailbox.

Version Control

As set out above, the system of the present example can limit the number of copies of a given item in the archive to one to optimize use of storage space. However, what appears to be a single item to a user may not be a single item from the point of view of the single instancing management control of the system of the present example. Accordingly, if two different versions of the same document are archived, both will be archived separately and, if the two versions share the same filename, a version qualifier which is appended to the item identifier within the archive enables the different versions to be uniquely identified. In the present example, the qualifier is a combination of the file name and its original location within a source folder prior to archival. In one example, the version qualifier is in fact a last modified date for the file. In another example, a specific version qualifier field is created and appended to the archived document as a header or as metadata. In one example, when a user retrieves the file, the last modified time and date is used to distinguish the different versions of a document.

Additionally, if an archived data item is retrieved and altered, the altered version will be stored as a new item in the archive. Again a version qualifier can be appended to the item identifier within the archive to enable the different versions to be uniquely identified.

An example of how version control can be implemented in the present example will now be described with reference to FIG. 7. The process of the present example is a modified version of the simple archival routine described with reference to FIG. 4 above.

Figure 7:
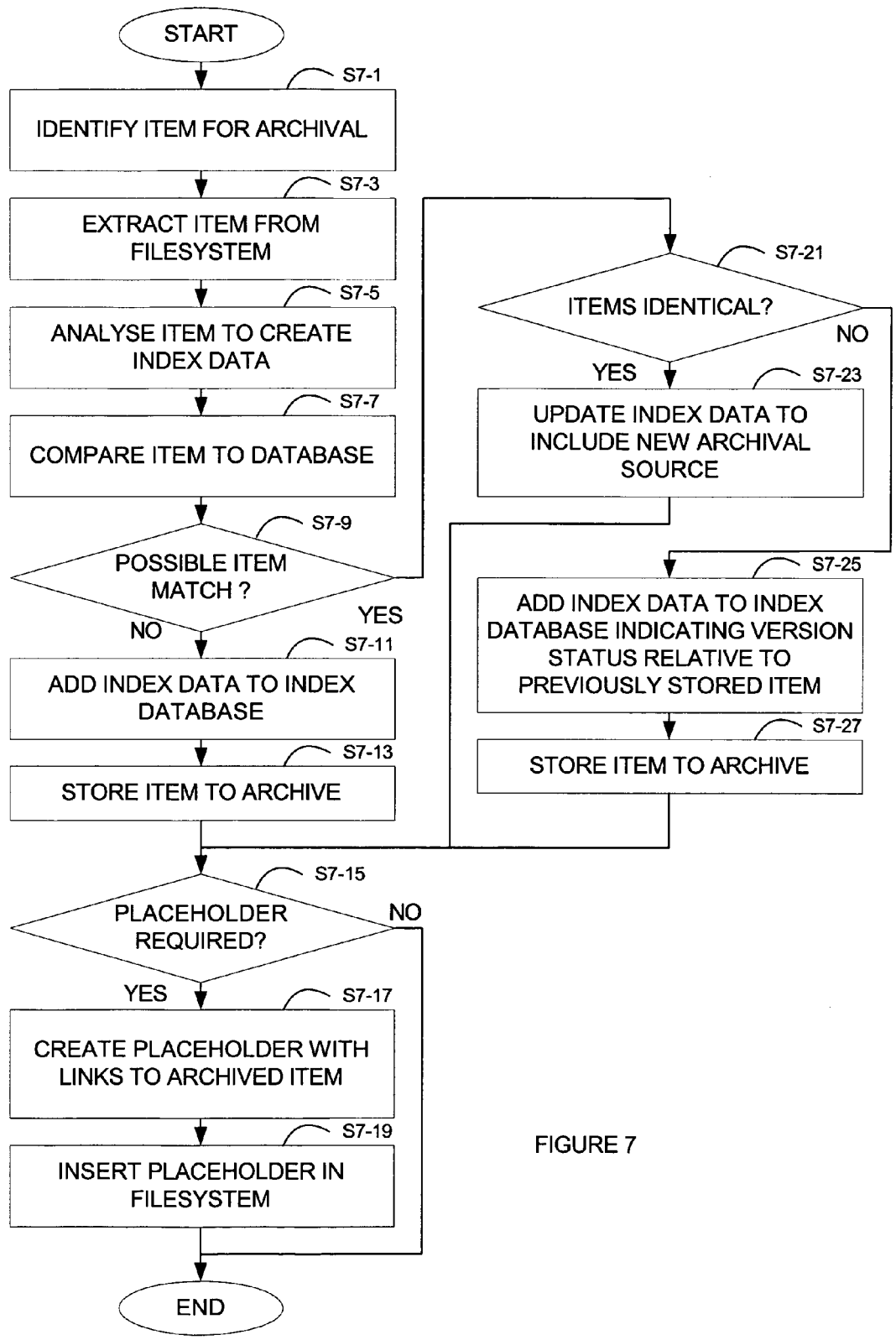
FIG. 7 shows a flow diagram of steps carried out during a single instancing data object archival process with version management.

As shown in FIG. 7, a data item is identified for archival at step S7-1. This message is then extracted from the file system at step S7-3 using, for example, the standard functionality of the file system.

At step S7-5 the item is analyzed to create index data describing the item for search and retrieval purposes. The item's properties and a checksum of the contents are then compared to existing items in the index database at step S7-7 to determine whether the file or any version of it has been archived before. The results of this comparison are used at step S7-9 to determine whether the same item or a previous version already exists in the index database. This check determines whether an item which could be the same item has already been archived. If the result of this check is negative, then processing continues at step S7-11 where index data is added to the index database. The index database returns a storage location identifier and the item is stored to the database at the location specified by the storage location identifier at step S7-13. Next, at step S7-15, a check is performed to determine whether a placeholder for the item is required. If not, the archival process is complete the method ends. On the other hand, if a placeholder is required, then at step S7-17, a placeholder item is created using the storage location identifier. In the present example, the placeholder format is defined by the standard mechanism for the target store so that its use will be transparent to any user or application interface. For example in a Windows™ file system, a standard Windows File System placeholder is used in conjunction with a purpose built Windows™ filter which is capable of automatically retrieving the item from the vault when the placeholder is accessed. Then, at step S7-19, the placeholder item is inserted into the file system at the place from which the item was removed and the process ends.

On the other hand, if it is determined at step S7-9 that a possible match has been found, then processing continues at step S7-9. In the present example, the item properties which can be taken into account for finding possible matches include a filename for the item to be archived. Additionally, the original author and/or location of the item can be taken into account to avoid different items with the same filename but created by different users or in different contexts being classified as versions of the same document. The comparison result is then used again at step S-21 to determine whether the new item is in fact identical in every respect to a previously archived item. If this is the case, then there is no need to create a new entry in the archive store as only a single instance of any item is required. In this case, at step S7-23, the index data for the already archived instance of the item is updated to include the new source of the archived item. Processing then continues at step S7-15 to determine whether a placeholder is required for the item at the location from which the archival request was made. Steps S7-17 and S7-19 are then carried out if necessary before processing ends.

Otherwise, if the new data item is determined to be a possible match at step S7-9 but is determined not to be identical to an existing archived item at step S7-21, then a new version of an existing archived item is being considered. In these circumstances, at step S7-25 a new index entry is made in the index database for the new item. This index data includes information identifying the item as a new version of a previously archived item. In the present example, this information can be a version qualifier appended to an item identifier such as a filename. The version qualifier is internal to the archive system and is optionally displayed to a user when the archived item is retrieved. The version qualifier can be ignored by a later comparison against a further item to be archived such that the comparison at step S7-7 can return a result identifying the later archived item as a version of the current item. Once the index entry has been made, the item is written to the archive at step S7-27 and processing continues at step S7-15 to determine whether a placeholder is required for the item at the location from which the archival request was made. Steps S7-17 and S7-19 are then carried out if necessary before processing ends.

Also, in some examples, it is possible to rename or move source folders/directories outside of the archive. To handle this situation, each folder/directory in the file system can be marked with hidden data which identifies the folder/directory to the vault system. If the folder is subsequently renamed or moved, the vault indexing system can be updated to reflect the new folder name or location so that the new name or location is recognized. This allows later versions to be recognized, even when the source folder on the users file system is different to the source folder of an earlier version.

Thus there has now been described a system for managing different versions of the same data object to allow different versions to be stored within an archive separately and without overwriting a previous version, but with identification of the versions as such. Thus during later retrieval, a history of different versions can be viewed to view development of a document over time. In some examples, a limit on the maximum number of versions of a given document which can be stored in the archive can be set. Thereby a limit on the amount of storage capacity which can be devoted to storing multiple versions of a single document can be achieved. In such circumstances, once the version count limit is reached archival of a new version can cause an earliest version to be deleted from the archive. Additionally, an age limit for versions can also be maintained, such that versions can be deleted once they reach a predefined age even if the maximum number of versions limit has not been reached. This predefined age limit can be user or administrator set to any desired length, which may be lower than a regulatory requirement for keeping documents. Once only a single version (the latest version) is left in the archive, this final version can be kept in the archive until a regulatory period for maintenance of documents expires.

Vault Storage

As discussed above, the storage provision within the vault or archive can be provided in a combination of online and offline storage resources. In one example, archived data can be migrated between storage resources having different access speeds during the lifetime of that data within the archive. For example, for the first three years of data storage, an item can be stored in a fast hard disk array providing fast direct access to each data item. After the first three years, the item can be migrated to slower hard disk based storage such as content addressable storage arrays. Content addressable storage is an object-oriented system for storing data that are not intended to be changed once they are stored (e.g., medical images, sales invoices, archived e-mail). When a data record is made within a content addressable storage system, it is assigned a unique identifying logical address, and that address is neither duplicated nor changed in order to ensure that the record always contains the exact same data as were originally stored. After another three years (total time in archive) the data may be migrated again, this time to offline storage such as storage tape. The data can then be kept on the offline storage until it reaches the maximum necessary lifespan (e.g. 15 years), at which time it can be deleted.

In some examples, migration from the fast online storage such as a dedicated vault fileserver or a storage area network to slower online storage can be dependent upon the nature of any regulatory requirements governing the storage of data. For example, where data is required to be in WORM (write once read many) storage by the time the data reaches a specified age (e.g. 24 hours), such migration can take place almost as soon as the data is placed into the archive. In such circumstances, the fast online storage may in effect act as a cache for data prior to that data being formatted for storage in the WORM storage.

In other examples, migration from the fast online storage such as a dedicated vault fileserver or a storage area network to slower online storage can alternatively or additionally be dependent upon a fill quota of the fast online storage. Such quotas can be set at a system, group or individual user level. For example, a user may be allocated a predetermined maximum vault size and when that space reaches 95% full, migration to slower online storage such as content addressable storage can be automatically initiated until the fill level is reduced to 75% of quota. Selection of files for migration in this way can be based on a variety of parameters, including age of file (time since archived into the vault), age since last access (time since the file was last accessed) and popularity of file (number of accesses of the file since archival into the vault).

Selection of files for migration to offline storage can also be based upon or influenced by age of file (time since archived into the vault), age since last access (time since the file was last accessed) and popularity of file (number of accesses of the file since archival into the vault). Thus very old files which are still regularly accessed can be maintained in online storage to avoid a need for a tape to be repeatedly re-accessed to retrieve the file.

In some examples, such data migration can be performed directly on the data stored in the fast initial storage arrangement. However, some forms of slower storage, both online and off-line, work inefficiently with large numbers of small files. For example, speed of writing, speed of copying to a mirror store (for deliberate data redundancy), efficiency of space usage (large numbers of files require larger indexes etc), and speed of restoration during disaster recovery. Accordingly, in the present example, an archived file concatenation scheme is employed to reduce the number of individual files to be written to the slower storage.

An example of migration from fast online storage, for example in a RAID storage array in a vault fileserver or storage area network, to slower online storage, for example a content addressable storage system, will now be described with reference to FIGS. 8 and 9. A content addressable storage system has the advantage of satisfying the WORM requirements of many regulatory requirements, while still providing a fast (relative to offline storage such as optical disk jukeboxes and tape) storage facility to enable users to retrieve archived items quickly.

In the present example it is assumed that, as indicated as a possibility above, email attachments have not been separated from their associated messages upon entry into the archive. If such attachment separation has already taken place, then the attachment separation steps outlined below can be omitted.

In many cases, the majority of the storage volume used by a given message store is occupied by large attachments to messages. This can be up to 80-90% of the storage volume. Many messages are identical due to having copies for sender and (possibly multiple) recipient(s). Further, many attachments are repeated in different messages. Therefore, significant storage optimization can be achieved by only storing one copy of each attachment regardless of the number of messages to which it belongs. Where a content addressable store is used for message storage, further optimization can be achieved by reducing the number of files stored in the content addressable store. This can be achieved by concatenating large numbers of messages into single container files while at the same time achieving the above mentioned sharing of identical attachments by extracting them from the containers and storing them separately.

Figure 8:
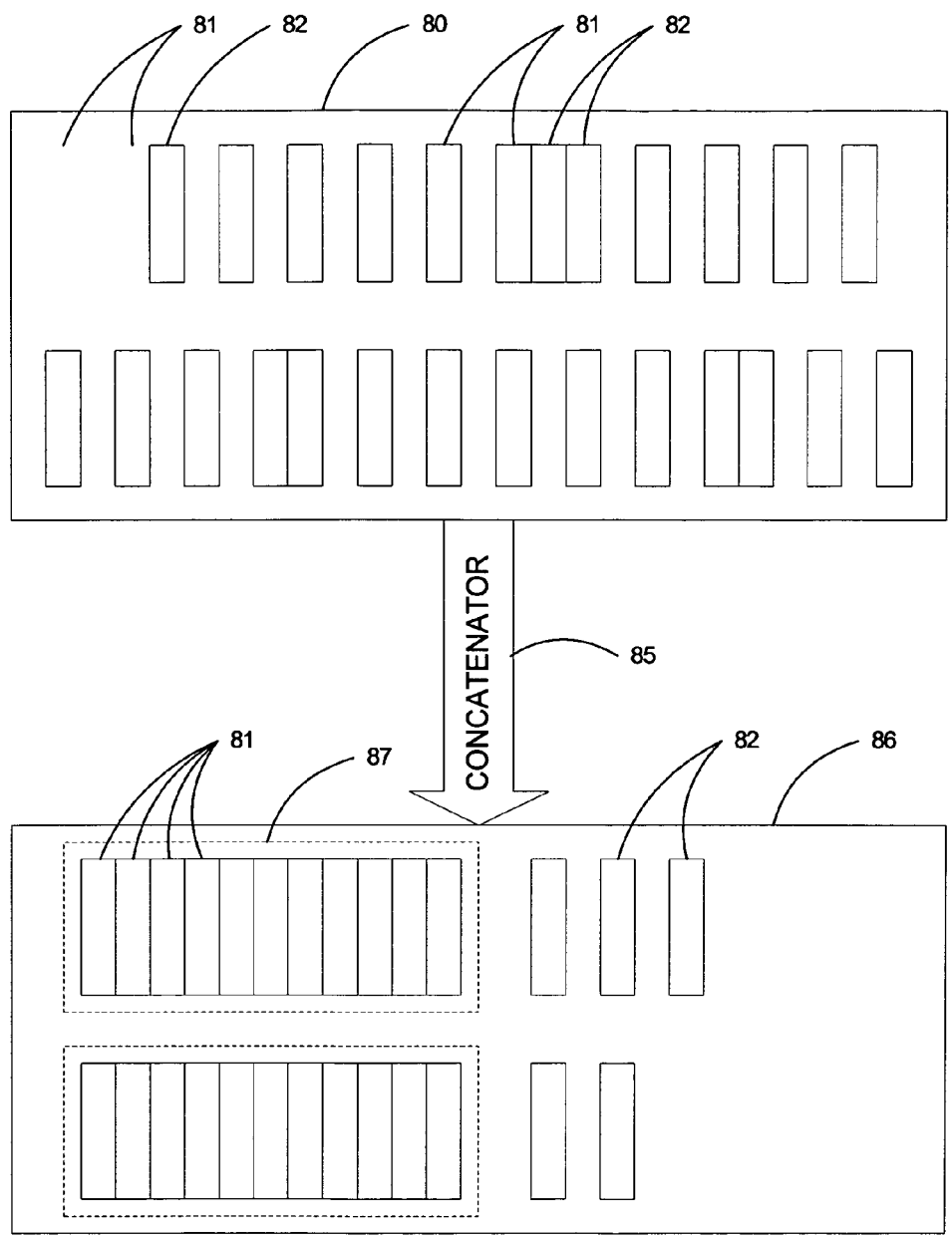
FIG. 8 shows a schematic representation of message concatenation for migration.
Figure 9:
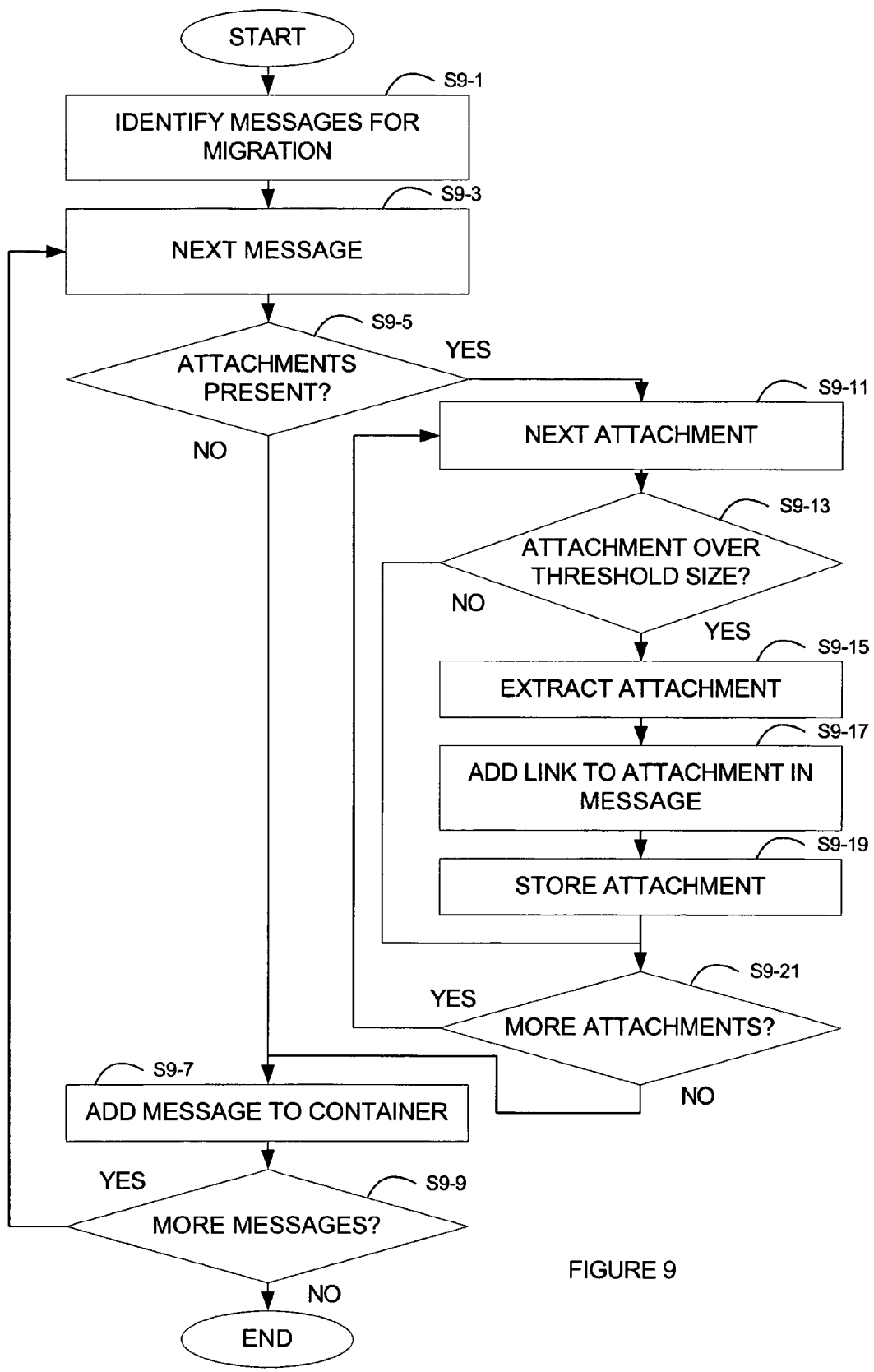
FIG. 9 shows a flow diagram of step carried out during a message concatenation process.

As shown in FIG. 8, a part 80 of the vault store 20 which is held in fast online storage can contain a number of messages 81, some of which may have associated attachments 82. A concatenator 85 is then used as part of a migration to a part 86 of the vault store 20 which is held in content addressable storage. The concatenator 85 arranges the individual messages 81 into container files 87. During this process, attachment files 82 larger than a threshold size are kept separate and are written to the content addressable storage as separate files. Each container file 87 can have a size limit based on a physical volume limit or a number of items contained limit. By imposing such a limit, a steady stream of new container files can be written to the content addressable storage part 86 of the archive store 20. By implementing such a rolling progress procedure, the size limits can be set to provide a reduced total number of individual items to be written to the content addressable storage thereby allowing efficient use of the content addressable storage to be made, while ensuring that any need to WORM store an item set by regulatory requirements are met.

This process of containerizing the messages will now be described in more detail with reference to FIG. 9.

Starting at Step S9-1, messages for migration are identified. Examples of conditions under which a message might be migrated have been discussed above. At step S9-3 a next message is selected. The message is analyzed at step S9-5 to determine whether it has any associated attachments. If not, then the message is added to a container file at step S9-7 following which a check is performed for more messages at step S9-9. If more messages remain for migration, then processing returns to step S9-3 where a next message is selected. If no more messages remain, then processing finishes.

On the other hand, if it is determined at step S9-5 that the message has associated attachments, then a next attachment for the message is selected at step S9-11. This attachment is then analyzed at step S9-13 to determine whether its size is over a predetermined threshold for attachment sizes. If the threshold is exceeded, then at step S9-15 the attachment is separated from the message and the message is modified to include an identifier of the attachment at step S9-17. This identifier allows the attachment to be re-associated with its message when the files are removed from the container file. The attachment is then stored separately at step S9-19, this may be directly to a content addressable storage system, or to a temporary storage area where the messages and attachments are held in escrow during the containerization process. A check is then performed to determine whether any more attachments are associated with that message at step S9-21, and if so processing returns to step S9-11 and a next attachment is selected. If no more attachments are associated with the message, processing continues at step S9-7 where the message is stored to the container. If any more messages remain, and the container limit has not been reached, then following step S9-9 processing returns to step S9-3 for a next message to be processed. Otherwise, the process ends.

The test carried out at step S9-13 to check for attachment size relative to a threshold allows effective management of space in the content addressable storage system. For very small attachment files, the extra space taken up by storing each attachment with its parent message is negligible compared to the management overhead and usage inefficiency with the content addressable storage system which would be caused by storing such small files separately, even if single instance sharing can be achieved. This is partly due to the additional overhead of the master database entry and other information held within the content addressable storage system for each separately stored file and partly due to the wastage caused by the use of large minimum allocation space units in which to store the file. On the other hand, for large attachment files the management overhead in storing the file separately in the content addressable storage becomes relatively negligible compared to the potential space saved by only storing the file once, and the potential advantage of single instance sharing is significant. Thus by using such a management system for control of how attachments are stored, an optimized use of the storage afforded by content addressable storage is possible.

As discussed above, in some examples, separation and single instancing of message attachments and other data objects may be carried out upon archival to the vault, and in other examples, this single instancing may be delayed until containerization for placing into, for example, content addressable storage. In examples where a storage system other than content addressable storage is to be used for WORM storage of archived items, then separation and single instancing of message attachments and other data items may typically be performed upon archival to the vault. As discussed above, in some examples, the messages and attachments are organized into containers at a temporary storage location before the complete container file and any associated attachments are written to the content addressable storage system. When the container files and any extracted attachments are written to the content addressable storage system, a check can be performed to determine whether a given attachment has already been written to the system. If so, rather than writing another copy of the attachment to the system, the pointer to the already stored attachment is re-used and is stored in the container. In the present example, the content addressable store always has a pointer to an item which is used as the item's unique identifier and the same pointer is used for all instances. This pointer is held within the vault's database and is not exposed in any pointer displayed to a user. The pointer is attached to the message from which the attachment is separated. The system can also be managed to determine whether an attachment has already been written to the content addressable store from another source, for example a file system. The content addressable storage system ensures that an item is not deleted until all instances of pointers to that item have been deleted.

In one example, a suitable content addressable storage system is the Centera system provided by EMC Corporation of Hopkinton, Mass.

Migration from online storage to off-line storage can be managed in a similar way to that described above. Off-line storage such as tape storage shares the property of inefficient handling of large numbers of small files with content addressable storage. Thus accumulating files for off-line storage into larger container files can provide opportunities for the optimization of the usage of such off-line storage.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A method for archival of messages, the method comprising:
    identifying a plurality of messages for archival;
    determining an attachment size relative to a threshold for each of a plurality of attachments to at least some of the plurality of messages;
    extracting ones of the plurality of attachments that are determined to exceed the threshold from said plurality of messages;
    creating a first container file;
    concatenating a first portion of the plurality of messages into the first container file, wherein the first container file excludes the extracted ones of the plurality of attachments;
    determining that the first container file meets a size limit;
    creating a second container file;
    concatenating a second portion of the plurality of messages into the second container file, wherein the second container file excludes the extracted ones of the plurality of attachments;
    storing the first and second container files in a content addressable storage system; and
    storing said extracted attachments in said content addressable storage system in files separate from the first and second container files.

2. The method of claim 1, wherein said plurality of messages are single instanced prior to said step of identifying.

3. The method of claim 1, wherein said extracting attachments includes extracting all attachments greater in size than a predetermined threshold value.

4. The method of claim 1, wherein said extracting attachments includes appending a link to an extracted attachment in a header of a message from which said attachment is extracted.

5. The method of claim 1, further comprising checking whether an extracted attachment has already been stored to said content addressable storage system and, if so, not storing the extracted attachment to the content addressable storage system.

6. The method of claim 1, wherein said plurality of messages include at least one email message.

7. The method of claim 1, wherein said plurality of messages include at least one instant message.

8. The method of claim 1, wherein the size limit is based on a physical volume limit.

9. The method of claim 1, wherein the size limit is based on a maximum number of messages.

10. A system for migration of stored data, the system comprising:
    at least one processor; and
    a memory coupled to the at least one processor, wherein the memory stores program instructions that are executable by the at least one processor to implement:
        a candidate identifier operable to identify messages for archival;
        a message analyzer operable to determine an attachment size relative to a threshold for each of a plurality of attachments to at least some of the messages and to extract ones of the plurality of attachments that are determined to exceed the threshold from the messages;
        a collator operable to create a plurality of container files and to concatenate the messages into one or more of the plurality of container files, wherein the plurality of container files comprises a first container file and a second container file, wherein the collator is operable to concatenate a first portion of the messages into the first container file until a size limit of the first container file is met, wherein the first container file excludes the extracted ones of the plurality of attachments, wherein the collator is operable to concatenate a second portion of the messages into the second container file, and wherein the second container file excludes the extracted ones of the plurality of attachments; and
        a storage manager operable to store the container files in a content addressable storage system and to store said extracted attachments in said content addressable storage system in files separate from the first and second container files.

11. The system of claim 10, wherein said message analyzer is operable to extract attachments from the messages if a predetermined size threshold is exceeded by an attachment.

12. The system of claim 11, wherein said message analyzer is operable not to extract attachments from the messages if the predetermined size threshold is not exceeded by an attachment.

13. The system of claim 10, wherein said candidate identifier is operable to identify messages for archival from a stored set of single instanced messages.

14. The system of claim 10, wherein said message analyzer is operable to include a link to an extracted attachment in a header of a message from which the attachment is extracted.

15. The system of claim 10, wherein said storage manager is operable to check whether an extracted attachment has already been stored to said content addressable storage system and, if so, to not store the extracted attachment to the content addressable storage system.

16. The system of claim 10, wherein said candidate identifier is operable to identify messages for archival from a stored set of messages including at least one email message.

17. The system of claim 10, wherein said candidate identifier is operable to identify messages for archival from a stored set of messages including at least one instant message.

18. The system of claim 11, wherein the size limit is based on a physical volume limit.

19. The system of claim 11, wherein the size limit is based on a maximum number of messages.

20. A system for migration of stored data, the system comprising:
    means for identifying messages for archival;
    means for determining an attachment size relative to a threshold for each of a plurality of attachments to at least some of the messages;
    means for extracting ones of the plurality of attachments that are determined to exceed the threshold from the messages;
    means for creating a first container file and concatenating a first portion of the messages into the first container file, wherein the first container file excludes the extracted ones of the plurality of attachments;
    means for determining that the first container file meets a size limit;
    means for creating a second container file and concatenating a second portion of the messages into the second container file, wherein the second container file excludes the extracted ones of the plurality of attachments; and
    means for storing the first and second container files in a content addressable storage system and for storing said extracted attachments in said content addressable storage system in files separate from the first and second container files.

* * * * *